US012564746B2

(12) United States Patent
Dafonseca et al.

(10) Patent No.: US 12,564,746 B2
(45) Date of Patent: Mar. 3, 2026

(54) ADJUSTABLE DROP

(71) Applicant: ASC Engineered Solutions, LLC, Portsmouth, NH (US)

(72) Inventors: Odair Dafonseca, Pawtucket, RI (US); Joseph Beagen, North Attleboro, MA (US)

(73) Assignee: ASC ENGINEERED SOLUTIONS, LLC, Oak Brook, IL (US)

( * ) Notice: Subject to any disclaimer, the term of this patent is extended or adjusted under 35 U.S.C. 154(b) by 0 days.

(21) Appl. No.: 18/385,123

(22) Filed: Oct. 30, 2023

(65) Prior Publication Data

US 2024/0066338 A1 Feb. 29, 2024

Related U.S. Application Data

(60) Continuation of application No. 17/877,278, filed on Jul. 29, 2022, now Pat. No. 11,833,378, which is a
(Continued)

(51) Int. Cl.
*A62C 35/68* (2006.01)
*A62C 37/11* (2006.01)
(Continued)

(52) U.S. Cl.
CPC .............. *A62C 35/68* (2013.01); *F16L 3/08* (2013.01); *F16L 15/02* (2013.01); *A62C 37/11* (2013.01);
(Continued)

(58) Field of Classification Search
CPC ........ A62C 35/68; F16L 15/02; F16L 27/125; F16L 27/0816
See application file for complete search history.

(56) References Cited

U.S. PATENT DOCUMENTS

| | | | |
|---|---|---|---|
| 3,073,134 A | 1/1963 | Mann | |
| 4,083,410 A | 4/1978 | Anderson | |

(Continued)

FOREIGN PATENT DOCUMENTS

| | | | |
|---|---|---|---|
| FR | 2306716 | 11/1976 | |
| KR | 20020052141 | 7/2002 | |
| KR | 20070059889 A | * | 6/2007 |

OTHER PUBLICATIONS

Dafonseca, Odair; Non-Final Office Action for U.S. Appl. No. 15/354,356, filed Nov. 17, 2016, mailed May 28, 2019, 16 pgs.
(Continued)

*Primary Examiner* — Zachary T Dragicevich
*Assistant Examiner* — James A Linford
(74) *Attorney, Agent, or Firm* — McAndrews Held & Malloy, Ltd.

(57) ABSTRACT

An adjustable drop includes an inner casing, the inner casing comprising: a distal end; a proximal end opposite the distal end, the proximal end comprising a shouldered segment; and a threaded segment between the distal end and the proximal end, the threaded segment starting at the shouldered segment and extending along the inner casing towards the distal end, the shouldered segment defining an outer radius that is greater than an outer radius of the threaded segment; and an outer casing surrounding the inner casing, the inner casing and the outer casing including corresponding threading to permit rotation between the inner casing and the outer casing to adjust an axial height, along a lengthwise axis of the adjustable drop, of the inner casing.

13 Claims, 9 Drawing Sheets

Related U.S. Application Data continuation of application No. 16/728,681, filed on Dec. 27, 2019, now Pat. No. 11,433,265, which is a division of application No. 15/354,356, filed on Nov. 17, 2016, now Pat. No. 10,561,872.

(51) Int. Cl.

| | |
|---|---|
| *F16B 7/18* | (2006.01) |
| *F16L 3/08* | (2006.01) |
| *F16L 3/133* | (2006.01) |
| *F16L 15/02* | (2006.01) |

(52) U.S. Cl.

CPC ........... *F16B 7/182* (2013.01); *F16B 2200/95* (2023.08); *F16L 3/133* (2013.01)

(56) References Cited

U.S. PATENT DOCUMENTS

| | | | |
|---|---|---|---|
| 4,932,686 | A | 6/1990 | Anderson, Jr. |
| 5,485,884 | A | 1/1996 | Hanley et al. |
| 6,119,784 | A | 9/2000 | MacDonald, III et al. |
| 7,032,680 | B2 | 4/2006 | MacDonald, III et al. |
| 9,278,238 | B2 | 3/2016 | Thau, Jr. et al. |
| 9,889,327 | B2 | 2/2018 | Mitchell et al. |
| 9,988,211 | B1 | 6/2018 | Just et al. |
| 10,016,644 | B2 | 7/2018 | Seo et al. |
| 10,426,985 | B2 | 10/2019 | Beagen et al. |
| 10,561,872 | B2 | 2/2020 | Dafonseca et al. |
| 10,610,716 | B2 | 4/2020 | Beagen et al. |
| 11,433,265 | B2 | 9/2022 | Dafonseca et al. |
| 11,833,378 | B2 | 12/2023 | Dafonseca et al. |
| 2002/0195817 | A1 | 12/2002 | Choi |
| 2004/0046089 | A1 | 3/2004 | Kirschner |
| 2008/0230238 | A1 | 9/2008 | Jackson |
| 2009/0271967 | A1 | 11/2009 | Orr |
| 2011/0260012 | A1 | 10/2011 | Oh |
| 2011/0315409 | A1 | 12/2011 | Silcox et al. |
| 2013/0048822 | A1 | 2/2013 | Liu et al. |
| 2014/0231103 | A1 | 8/2014 | Savage et al. |
| 2016/0223105 | A1 | 8/2016 | Oh |
| 2018/0133528 | A1 | 5/2018 | Dafonseca et al. |
| 2020/0129797 | A1 | 4/2020 | Dafonseca et al. |
| 2022/0362597 | A1 | 11/2022 | Dafonseca et al. |
| 2024/0066339 | A1 | 2/2024 | Dafonseca et al. |

OTHER PUBLICATIONS

Dafonseca, Odair; Notice of Allowance for U.S. Appl. No. 15/354,356, filed Nov. 17, 2016, mailed Oct. 31, 2019, 9 pgs.

Dafonseca, Odair; Requirement for Restriction/Election for U.S. Appl. No. 15/354,356, filed Nov. 17, 2016, mailed Jan. 2, 2019, 6 pgs.

Dafonseca, Odair; Non-Final Office Action for U.S. Appl. No. 16/728,681, filed Dec. 27, 2019, mailed Feb. 16, 2022, 28 pgs.

Dafonseca, Odair; Notice of Allowance for U.S. Appl. No. 16/728,681, filed Dec. 27, 2019, mailed May 6, 2022, 8 pgs.

Dafonseca, Odair; Final Office Action for U.S. Appl. No. 17/877,278, filed Jul. 29, 2022, mailed Apr. 24, 2023, 9 pgs.

Dafonseca, Odair; Non-Final Office Action for U.S. Appl. No. 17/877,278, filed Jul. 29, 2022, mailed Jan. 4, 2023, 18 pgs.

Dafonseca, Odair; Notice of Allowance for U.S. Appl. No. 17/877,278, filed Jul. 29, 2022, mailed Jul. 31, 2023, 10 pgs.

Dafonseca, Odair; Restriction Requirement for U.S. Appl. No. 17/877,278, filed Jul. 29, 2022, mailed Nov. 16, 2022, 7 pgs.

Dafonseca, Odair; Office Action for Canadian patent application No. 2,980,444, filed Sep. 27, 2017, mailed Dec. 14, 2023, 5 pgs.

Dafonseca, Odair; Office Action for Mexico patent application No. MX/a/2017/014224, filed Nov. 6, 2017, mailed Nov. 30, 2021, 5 pgs.

Dafonseca, Odair; Office Action for Mexico patent application No. MX/a/2017/014224, filed Nov. 6, 2017, mailed May 27, 2022, 9 pgs.

Dafonseca, Odair; Office Action for Mexico patent No. MX/a/2022/009713, filed Nov. 6, 2017, mailed Aug. 16, 2023, 5 pgs.

* cited by examiner

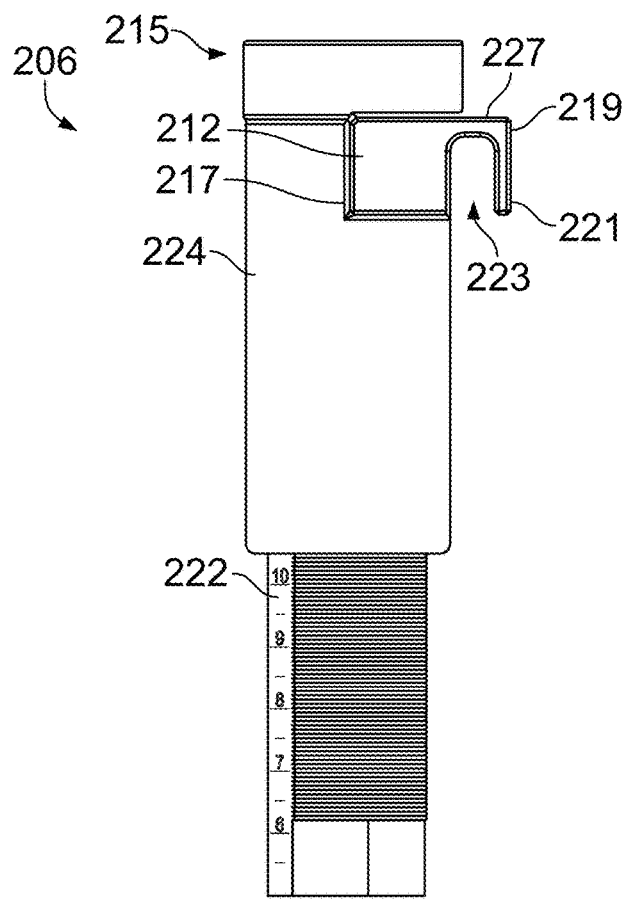
FIG. 10
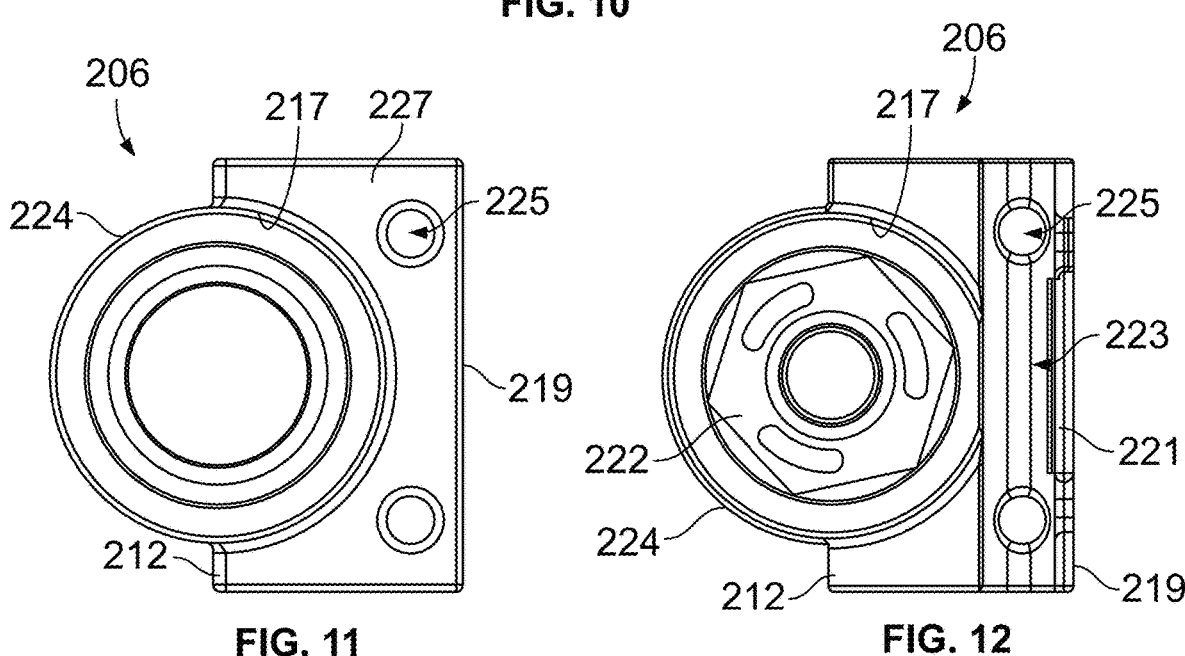
FIG. 11                 FIG. 12

ADJUSTABLE DROP

CROSS-REFERENCE TO RELATED APPLICATIONS

The present application is a continuation of U.S. application Ser. No. 17/877,278, filed Jul. 29, 2022, which is a continuation of U.S. application Ser. No. 16/728,681, filed Dec. 27, 2019, which issued into U.S. Pat. No. 11,433,265 on Sep. 6, 2022, which is a divisional of U.S. application Ser. No. 15/354,356, filed Nov. 17, 2016, which issued into U.S. Pat. No. 10,561,872 on Feb. 18, 2020, each of which are hereby specifically incorporated by reference herein in its entirety.

BACKGROUND OF THE DISCLOSURE

Field of the Disclosure

The present disclosure relates to fire sprinkler assemblies and, more particularly, to an adjustable drop that allows modification of a position of a sprinkler head.

Discussion of Related Art

A typical automatic fire sprinkler system includes a network of pipes that carry a fire suppression fluid, e.g., water, to one or more rooms in a building. Conduit sections carry the fluid from the pipes to sprinkler heads strategically located in different rooms. The position and orientation of each sprinkler head is typically maintained in place by a support assembly. When the room reaches an elevated temperature due to a fire, the sprinkler head is activated, allowing a stream of fire suppression fluid to be directed over the intended area of coverage. During operation, the fluid pressure at the sprinkler head can reach as high as 175 psi, generating significant back pressure on the sprinkler support system. The support assembly is used to hold the sprinkler securely in place during operation.

Due to variations in drop ceiling heights, it may be necessary to adjust the height of the sprinkler head during or after installation.

SUMMARY OF THE DISCLOSURE

In view of the foregoing, there is a need in the art for a fire sprinkler assembly including an adjustable drop and bracket hub that reduces installation time and allows adjustment of sprinkler head height and orientation in regards to standard commercial application on a suspended T-Bar grid system for the fire protection industry.

Disclosed is a fire sprinkler assembly comprising a flexible conduit; and an integral hub and bracket assembly comprising: a bracket hub coupled to a bracket bar; and an adjustable drop integrally formed with the bracket hub, the adjustable drop defining a lengthwise axis oriented transverse to the bracket bar, the flexible conduit coupled to the adjustable drop; and a sprinkler head extending from the adjustable drop.

Also disclosed is a fire sprinkler assembly comprising a bracket bar; a bracket hub defining an inverted U-shaped opening, the inverted U-shaped opening configured to be lowered onto the bracket bar during assembly; a flexible conduit; and an adjustable drop coupled to the bracket hub and to the flexible conduit, wherein a lengthwise axis of the adjustable drop is oriented transverse to the bracket bar.

A fire sprinkler assembly according to exemplary embodiments of the disclosure can comprise a bracket hub coupled to a bracket bar; a flexible conduit; an adjustable drop coupled to the bracket hub, the adjustable drop defining a lengthwise axis oriented transverse to the bracket bar, and the adjustable drop comprising: an inner casing, wherein the flexible conduit is directly coupled to the inner casing; and an outer casing surrounding the inner casing, the inner and outer casings including corresponding threading to permit rotation between the inner casing and the outer casing to adjust an axial height, along the lengthwise axis, of the inner casing; and a sprinkler head extending from the adjustable drop.

A fire sprinkler assembly according to exemplary embodiments of the disclosure can comprise a bracket hub coupled to a bracket bar; a flexible metal conduit; and an adjustable drop coupled to the bracket hub and to the flexible metal conduit, wherein a lengthwise axis of the adjustable drop is oriented transverse to the bracket bar, and wherein the adjustable drop comprises: an inner casing including threading, wherein the flexible metal conduit is directly coupled to the inner casing; and an outer casing surrounding the inner casing, the outer casing including mating threading for engagement with the threading of the inner casing, wherein the threading and mating threading permit rotation between the inner casing and the outer casing to adjust an axial height, along the lengthwise axis, of a sprinkler head coupled to a distal end of the inner casing.

A method for adjusting a height of an adjustable drop can comprise providing the adjustable drop, the adjustable drop comprising an inner casing and an outer casing, the outer casing comprising a first end wall and a second end wall, the inner casing comprising a bellow, the bellow comprising a first tube and a support ring; rotating the outer casing upward towards the first tube; contacting the support ring with the second end wall; and contracting the bellow.

Also disclosed is an adjustable drop comprising an inner casing, the inner casing comprising: a distal end; a proximal end opposite the distal end, the proximal end comprising a shouldered segment; and a threaded segment between the distal end and the proximal end, the threaded segment starting at the shouldered segment and extending along the inner casing towards the distal end, the shouldered segment defining an outer radius that is greater than an outer radius of the threaded segment; and an outer casing surrounding the inner casing, the inner casing and the outer casing including corresponding threading to permit rotation between the inner casing and the outer casing to adjust an axial height, along a lengthwise axis of the adjustable drop, of the inner casing.

Additionally, disclosed is an adjustable drop comprising an inner casing comprising: an expandable component; a first tube; and a second tube, wherein the expandable component extends between the first and second tubes, and wherein the expandable component permits movement of the first tube relative to the second tube along a lengthwise axis of the adjustable drop; and an outer casing surrounding the inner casing.

Furthermore, disclosed is an integral hub and drop assembly comprising a bracket hub; and an adjustable drop integrally formed with the bracket hub, the adjustable drop defining a lengthwise axis; wherein the bracket hub defines an inverted U-shaped opening offset to a first side of the lengthwise axis, the inverted U-shaped opening configured to receive a bracket bar, and wherein the bracket hub further defines a U-shaped side opening transverse to the inverted U-shaped opening, the adjustable drop extending through the U-shaped side opening

3

BRIEF DESCRIPTION OF THE DRAWINGS

The accompanying drawings illustrate exemplary approaches of the disclosure, including the practical application of the principles thereof, and in which:

FIG. 10 is a side view of an adjustable drop of the fire sprinkler assembly of FIG. 9 according to exemplary approaches of the disclosure;

FIG. 11 is a top view of the adjustable drop of FIG. 10 according to exemplary approaches of the disclosure;

FIG. 12 is a bottom view of the adjustable drop of FIG. 10 according to exemplary approaches of the disclosure;

Figure 1:
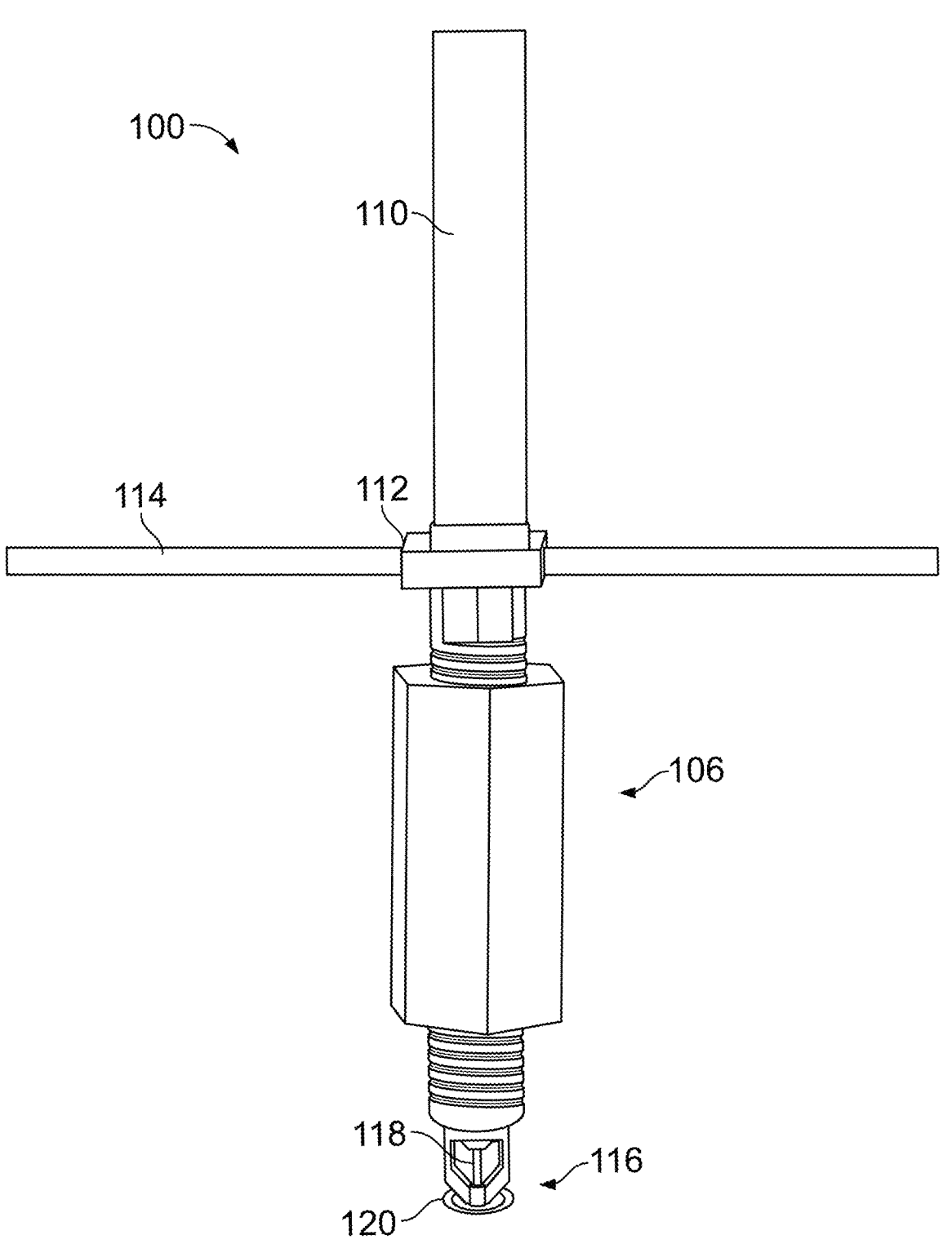
FIG. 1 is a perspective view of a fire sprinkler assembly according to exemplary approaches of the disclosure.

The drawings are not necessarily to scale. The drawings are merely representations, not intended to portray specific parameters of the disclosure. Furthermore, the drawings are intended to depict exemplary embodiments of the disclosure, and therefore is not considered as limiting in scope. Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DESCRIPTION OF EMBODIMENTS

The present disclosure will now proceed with reference to the accompanying drawings, in which various approaches are shown. It will be appreciated, however, that the disclosed approaches may be embodied in many different forms and should not be construed as limited to the approaches set forth herein. Rather, these approaches are provided so that this disclosure will be thorough and complete, and will fully convey the scope of the disclosure to those skilled in the art. In the drawings, like numbers refer to like elements throughout.

As used herein, an element or operation recited in the singular and proceeded with the word "a" or "an" should be understood as not excluding plural elements or operations, unless such exclusion is explicitly recited. Furthermore, references to "one approach" of the present disclosure are not intended to be interpreted as excluding the existence of additional approaches that also incorporate the recited features.

Furthermore, spatially relative terms, such as "beneath," "below," "lower," "central," "above," "upper," and the like, may be used herein for ease of describing one element's relationship to another element(s) as illustrated in the figures. It will be understood that the spatially relative terms may encompass different orientations of the device in use or operation in addition to the orientation depicted in the figures.

As stated above, exemplary approaches herein provided a fire sprinkler assembly including a bracket hub coupled to a bracket bar, and an adjustable drop coupled to the bracket hub. The adjustable drop may include an inner casing including threading disposed on an outer surface thereof, and an outer casing surrounding the inner casing, and to permit rotation between the inner casing and the outer casing to adjust an axial height, along a lengthwise axis, of the inner casing. In some approaches, a flexible metal conduit is directly coupled to a distal end of the inner casing or the outer casing of the adjustable drop. As used throughout the description and claims, the term "proximal" refers to a position of the that is located towards the bracket bar, while the term "distal" refers to a position that is located towards the sprinkler head.

In some approaches, the inner casing includes a bellow disposed within an interior cavity of the outer casing, permitting contraction or expansion of the inner casing. The bellow may be connected directly (e.g., welded) to the bracket hub and/or the flexible metal conduit, and may include turn threads that expand or retract the bellow body based on the direction the bellow is rotated. A sprinkler head is threaded into the bottom side of the bellow drop, while the metal flexible conduit may be threaded into the top side of the bellow. Once assembled, an installer can more effectively adjust the sprinkler head height and orientation, for example, using a keying feature formed in a distal end of the outer casing.

In other approaches, the inner casing includes one or more gaskets, and the bracket hub is coupled (e.g., welded) to the outer casing for mounting on the bracket bar. The sprinkler head is threaded into the distal end of the gasket, and the flexible metal conduit is threaded into the proximal end of the outer casing. Once the hose is mounted into the bracket hub and the bracket hub is mounted into the bracket bar, an installer can adjusted sprinkler head height and orientation, for example, using a keying feature formed in a distal end of the outer casing.

FIG. 1 shows a fire sprinkler assembly (hereinafter "assembly") 100, which may be a wet or dry-type fire suppression sprinkler assembly, according to exemplary embodiments of the disclosure. As shown, the sprinkler assembly 100 may include a sprinkler body or adjustable drop 106 coupled to a flexible conduit 110. The sprinkler assembly 100 may further include a bracket hub 112 coupling the adjustable drop 106 to a bracket bar 114. A thermally responsive sprinkler head 116 extends downward from the adjustable drop 106, through an opening in a ceiling or wall (not shown), and into an environment to be protected. The assembly 100 may be mounted within a ceiling having a ceiling frame of rectangular frame sections, such as bracket bar 114, arranged in a grid pattern. In some embodiments the ceiling frame may be a suspended ceiling.

The adjustable drop 106 acts as a conduit for a fire suppressant. In the event of a fire, a thermally responsive device 118 of the sprinkler head 116 reacts to heat generated by a fire to allow fluid to flow through the adjustable drop 106 and into a deflector 120, where the fluid is dispersed outwardly to extinguish the fire. Although a fluid commonly used in such dry sprinklers is water, other fire retardant fluids including nitrogen and halogen, may also be used in various embodiments.

Figure 2:
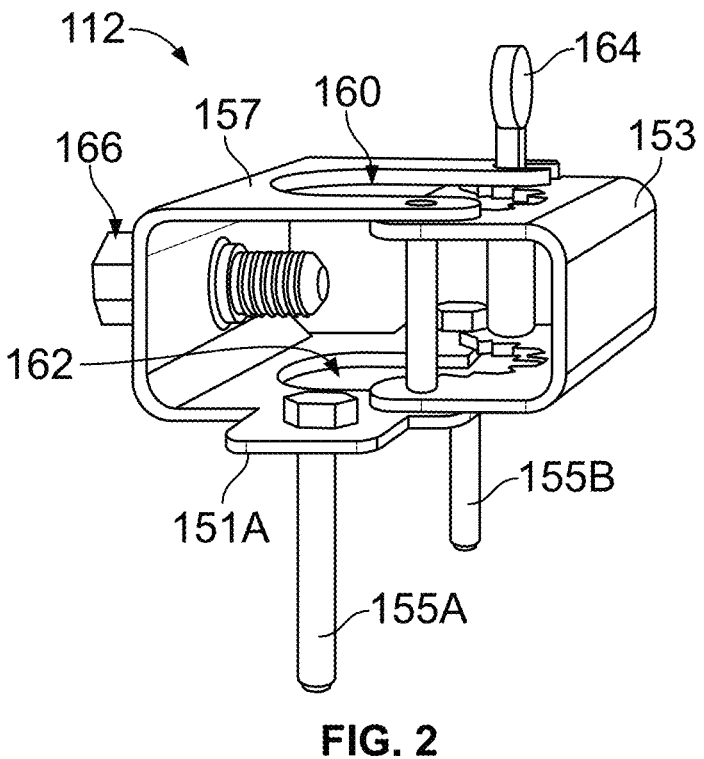
FIG. 2 is a perspective view of a bracket hub of the fire sprinkler assembly of FIG. 1 according to exemplary approaches of the disclosure.
Figure 3:
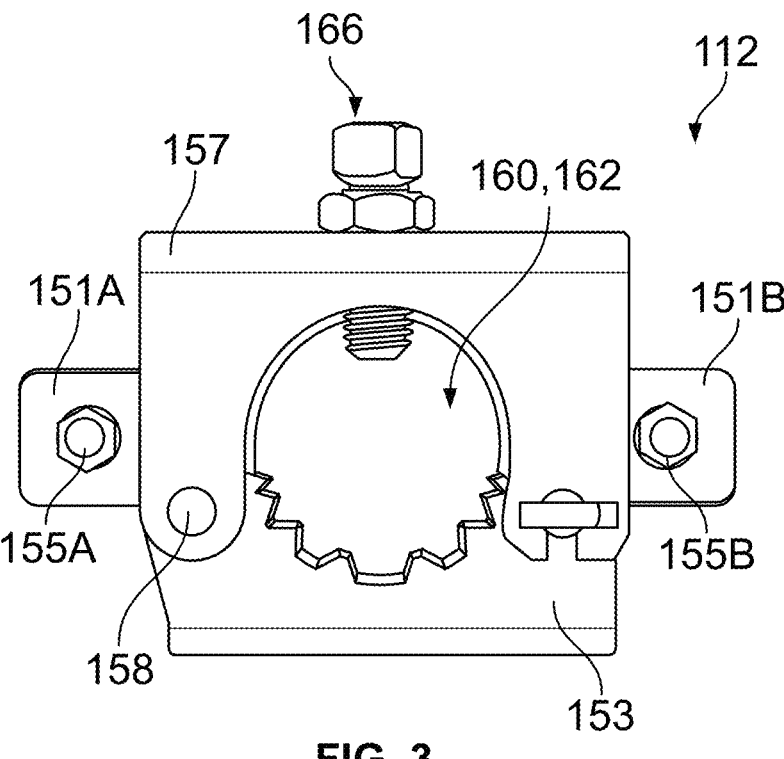
FIG. 3 is a top view of the bracket hub of the fire sprinkler assembly of FIG. 2 according to exemplary approaches of the disclosure.
Figure 4:
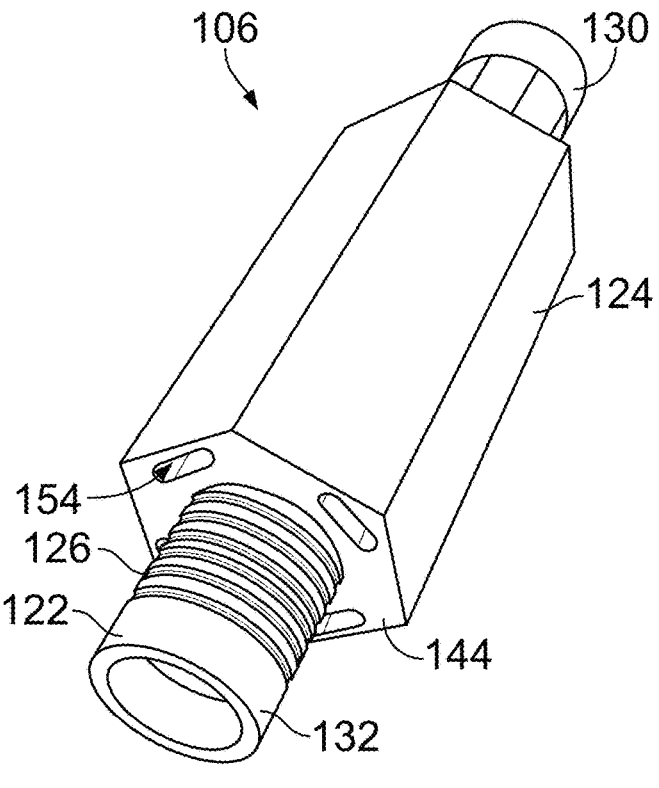
FIG. 4 is a perspective view of an adjustable drop of the fire sprinkler assembly of FIG. 1 according to exemplary approaches of the disclosure.
Figure 5:
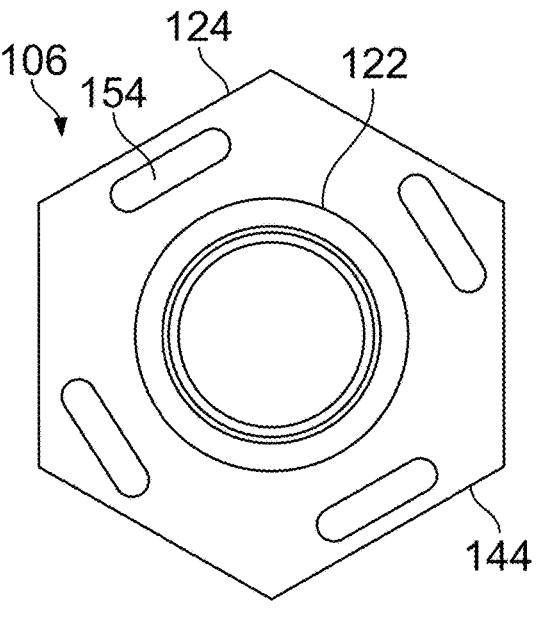
FIG. 5 is a bottom view of the adjustable drop of FIG. 4 according to exemplary approaches of the disclosure.
Figure 6:
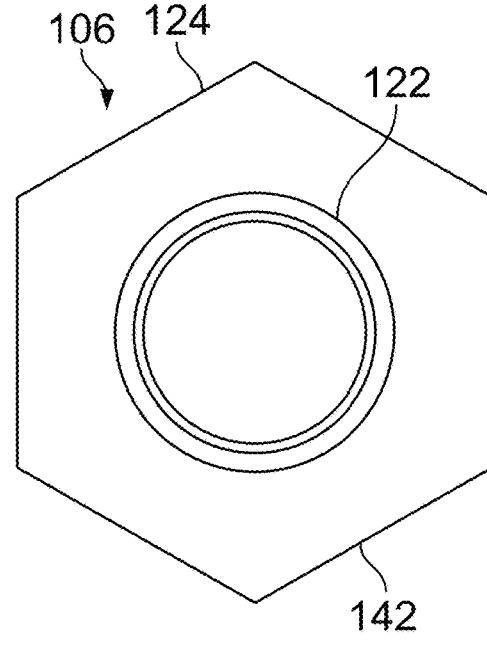
FIG. 6 is a top view of the adjustable drop of FIG. 4 according to exemplary approaches of the disclosure.
Figure 7:
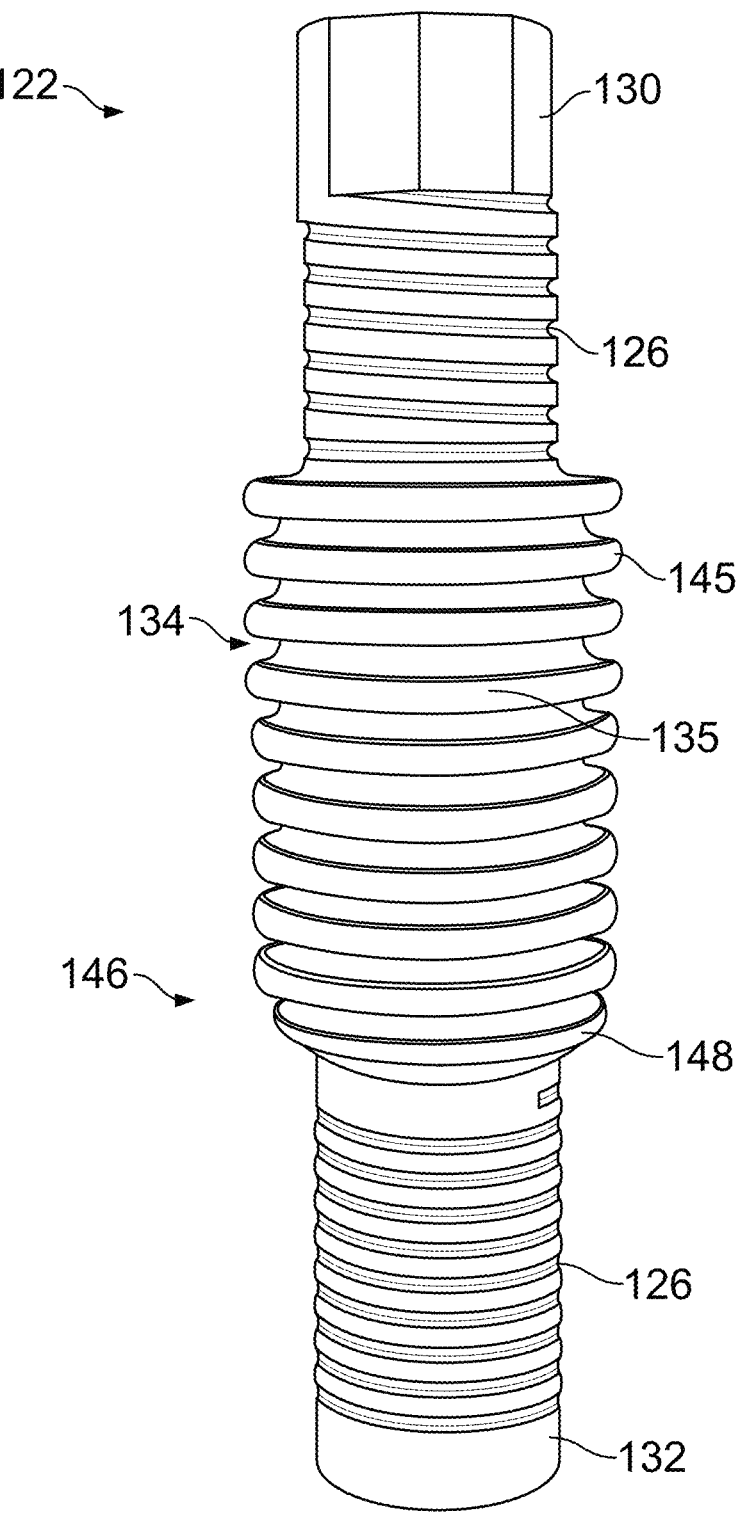
FIG. 7 is a side perspective view of an inner casing of the adjustable drop of FIG. 4 according to exemplary approaches of the disclosure.

In exemplary embodiments, the adjustable drop 106 is secured to the ceiling by the bracket hub 112, which is shown in greater detail in FIGS. 2-3. In some embodiments, the bracket hub 112 may be a hub assembly including a primary support 157 including a set of laterally extending tabs 151A-B, which may mount to the bracket bar 114 via the set of fasteners 155A-B, and a secondary support 153 that is rotatably connected to the primary support 157. The secondary support 153 rotates relative to the primary support 157 about a pin 158 between an open position (not shown) and a closed position (shown). The primary support 157 and secondary support 153 are each formed having cut out portions 160, 162, so that when the secondary support 153 is in the closed position relative to the primary support 157, the cut out portion 160 formed in the primary support 157 cooperates with the cut out portion 162 formed in the secondary support 153 to define a hub opening configured to receive and securely retain the adjustable drop 106 therein. When the bracket hub 112 is secured to the bracket bar 114, the hub opening may coincide with an opening through the ceiling. In addition, the bracket hub 112 includes a locking mechanism 164 that selectively connects the primary support 157 to the secondary support 153, and an adjustment mechanism 166 (e.g., a set screw) provided on the primary support 157 is used to secure the position of the sprinkler body 112 within the hub opening.

The flexible conduit 110 may include a flexible portion that comprises, for example, a corrugated tube, a hose, or a braided tube, which can be made from known materials including metal, rubber, etc. In an exemplary embodiment, the flexible conduit 110 is corrugated metal with a braided metal covering, which is joined to the bracket hub 112 by welding or screw connectors. The flexible conduit 110 may be flexible along its entire length, or may include one or more flexible portions adjacent more rigid portions. In one non-limiting embodiment, the flexible conduit 110 may have a low elasticity so that when bent into a desired position, the flexible conduit 110 it maintains its shape and does not return to its original position.

Figure 8:
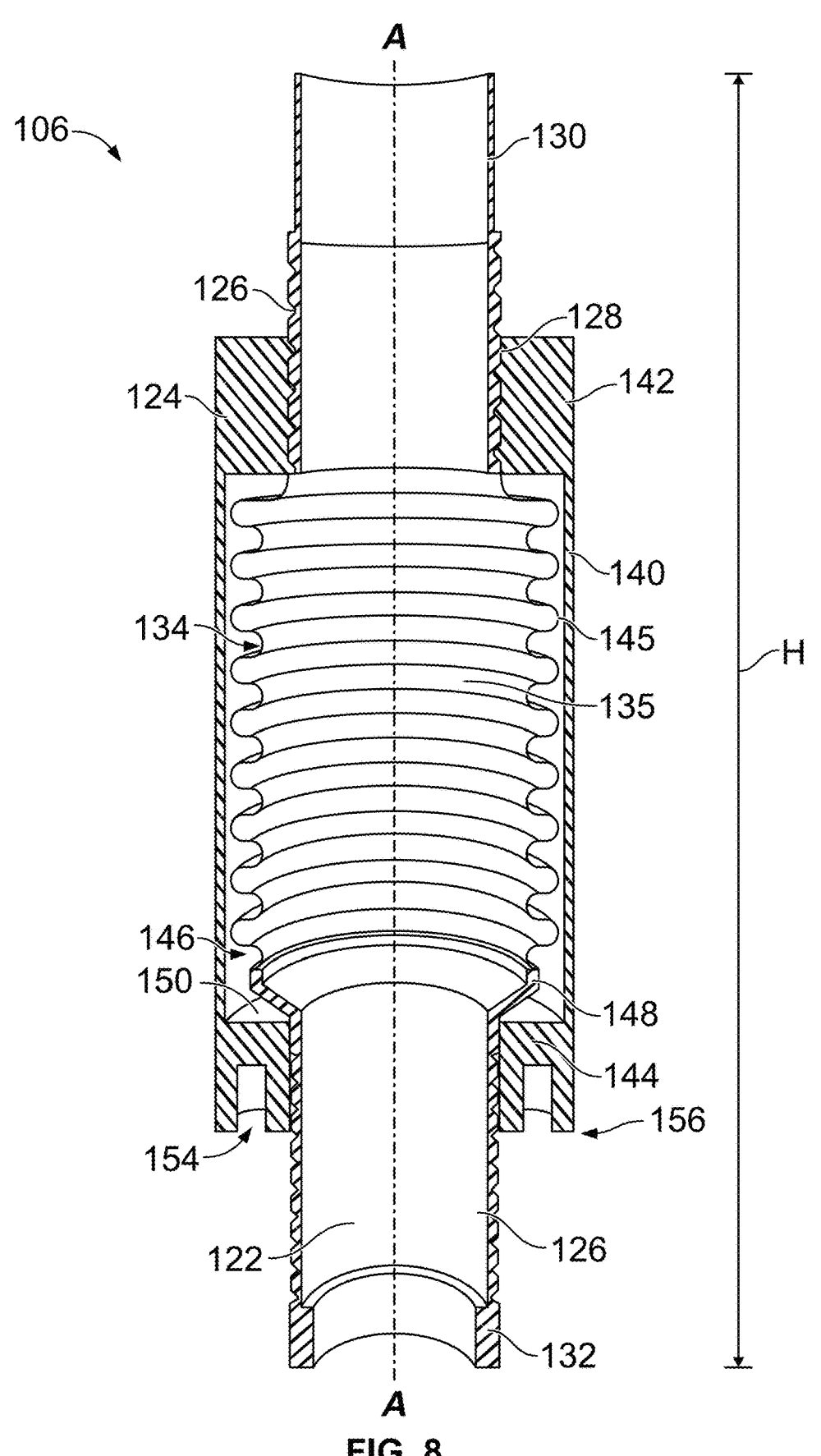
FIG. 8 is a side cutaway view of the adjustable drop of FIG. 4 according to exemplary approaches of the disclosure.

Turning now to FIGS. 4-8, the adjustable drop 106 according to embodiments of the disclosure will be described in greater detail. As shown, the adjustable drop 106 includes an inner casing 122 concentrically arranged within an outer casing 124. The inner and outer casings 122, 124 are permitted to rotate relative to one another to adjust an axial height, along a lengthwise axis A-A (FIG. 8). To accomplish this, the inner casing 122 may include external threading 126 for engagement with corresponding internal threading 128 of the outer casing 124. In exemplary embodiments, the inner casing 122 may include a bellow 135 having an expandable/elastic central component 134, and a first tube 130 directly coupled to the bracket hub 112. The bellow 135 may further include a second tube 132 configured to receive the sprinkler head 116 therein, e.g., via an internal threaded connection.

As shown in FIG. 8, the bellow 135 extends entirely through the outer casing 124, while the expandable central component 134 is contained within an interior cavity 138

(FIG. 7) of the outer casing 124. The interior cavity 138 is defined by a side wall 140 extending between the first end wall 142 and the second end wall 144 disposed on opposite sides of the central component 134. This arrangement of the bellow 135 eliminates points of connection, and thus potential leakage spots within the interior cavity 138, between the inner and outer casings 122, 124. In exemplary embodiments, the central component 134 is coupled to, or integrally formed with, the first and second tubes 130, 132, and is provided to permit movement of the first tube 130 relative to the second tube 132.

The bellow 135 may be formed of metal, such as stainless steel, arranged in a mesh-like or woven pattern. In certain embodiments, the bellow 135 may be constructed by hydroforming thin-walled tubing to produce convolutions, inserting a spiral-wound liner into the convolutions, and then welding or otherwise securing the liner in place to form a plurality of ring or screw-shaped corrugations 145.

In various embodiments, the bellow 135 can be made as a single-wall or multiple-wall structure. If a multiple-wall structure is used, the separate layers of the wall may be made of different materials, especially in view of corrosion effects which might differentially affect materials used in the adjustable drop 106. The cross-sectional shape need not be circular, but may be oval, which is used sometimes to properly fit the conduit element within available space. It will be appreciated that the material, internal diameter, external diameter, and length of the bellow 135 may vary depending on the geometry of the internal cavity 138 of the outer casing 124.

As further shown, a distal end 146 of the bellow 135 includes a support ring 148 at the intersection of the bellow 135 and the second tube 132. In exemplary embodiments, the support ring 148 is a rigid element positioned directly adjacent an interior surface 150 of the second end wall 144. During use, the interior surface 150 of the second end wall 144 engages the support ring 148 to cause the second tube 132 to move towards the first tube 130 along the longitudinal axis A-A. For example, to raise the sprinkler head 116, an installer may rotate the outer casing 124 upwards towards the first tube 130, thus causing the second end wall 144 to make contact with the support ring 148, which contracts the bellow 135. As a result, an overall height 'H' of the adjustable drop 106 is reduced, raising the sprinkler head 116 relative to the bracket bar 114. Conversely, to lower the sprinkler head 116, the installer may rotate the outer casing 124 downwards towards the second tube 132, thus allowing the bellow 135 to expand along the lengthwise axis A-A. As a result, an overall height 'H' of the adjustable drop 106 is increased, which lowers the sprinkler head 116 relative to the bracket bar 114.

In some embodiments, a keying feature 154, such as a recess or slot, may be formed in a distal end 156 of the outer casing 124 to assist the installer. The keying feature 154 is configured to receive a corresponding mating male tool or device, which enables rotation of the outer casing 124 about the inner casing 122.

Figure 9:
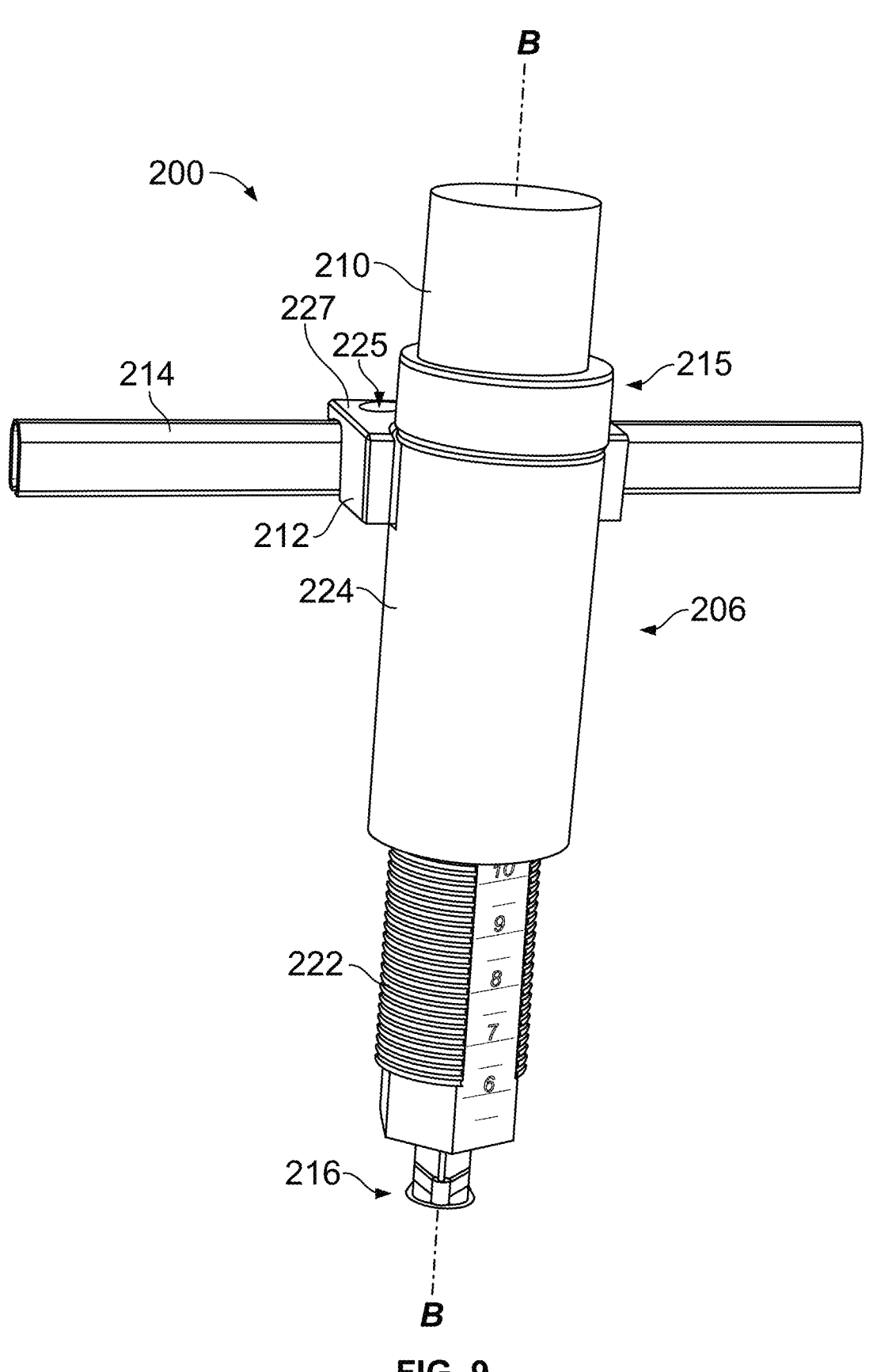
FIG. 9 is a perspective view of a fire sprinkler assembly according to exemplary approaches of the disclosure.

FIG. 9 shows a fire sprinkler assembly (hereinafter "assembly") 200, which may be a wet or dry-type fire suppression sprinkler assembly, according to exemplary embodiments of the disclosure. As shown, the assembly 200 may include a sprinkler body or adjustable drop 206 coupled to a flexible conduit 210. The sprinkler assembly 200 may further include a bracket hub 212 coupling an adjustable drop 206 to a bracket bar 214. As shown, the adjustable drop has a lengthwise axis B-B, which is transverse (e.g., perpendicular) to bracket bar and/or the bracket hub 212. A thermally responsive sprinkler head 216 extends downward from the adjustable drop 206, through an opening in a ceiling or wall, and into an environment to be protected. The assembly 200 may be mounted to a ceiling frame of rectangular frame sections, such as the bracket bar 214, arranged in a grid pattern.

The adjustable drop 206 includes an inner casing 222 concentrically arranged within the outer casing 224. As will be described in greater detail below, the inner and outer casing 222, 224 include corresponding threading that permits rotation therebetween to adjust an axial height, along a central axis of rotation B-B, of the inner casing 222 and the sprinkler head 216 relative to the bracket bar 214. In exemplary embodiments, the flexible metal conduit 210 is directly coupled to a proximal end 215 of the outer casing 224, for example, via internal threading 211 (FIG. 14).

The adjustable drop 206 may be secured to the ceiling by the bracket hub 212, which is shown in greater detail in FIGS. 10-12. In some embodiments, the bracket hub 212 is coupled to, or integrally formed with (e.g., welded), the proximal end 215 of the outer casing 224 of the adjustable drop 206. As shown, the bracket hub 212 includes a first side 217, which in some embodiments is a semicircle formed about a circumference of the outer casing 224, and a second side 219 including an arm 221, which extends around the bracket bar 214. For example, the bracket hub 212 may include an inverted U-shape opening 223, which enables the bracket hub 212 to be easily lowered atop the bracket bar 214 during assembly. A set of openings 225 formed through a top wall 227 of the bracket hub 212 may receive fasteners (not shown), such as screws or bolts, etc., to further secure the bracket hub 212 to the bracket bar 214.

Figure 13:
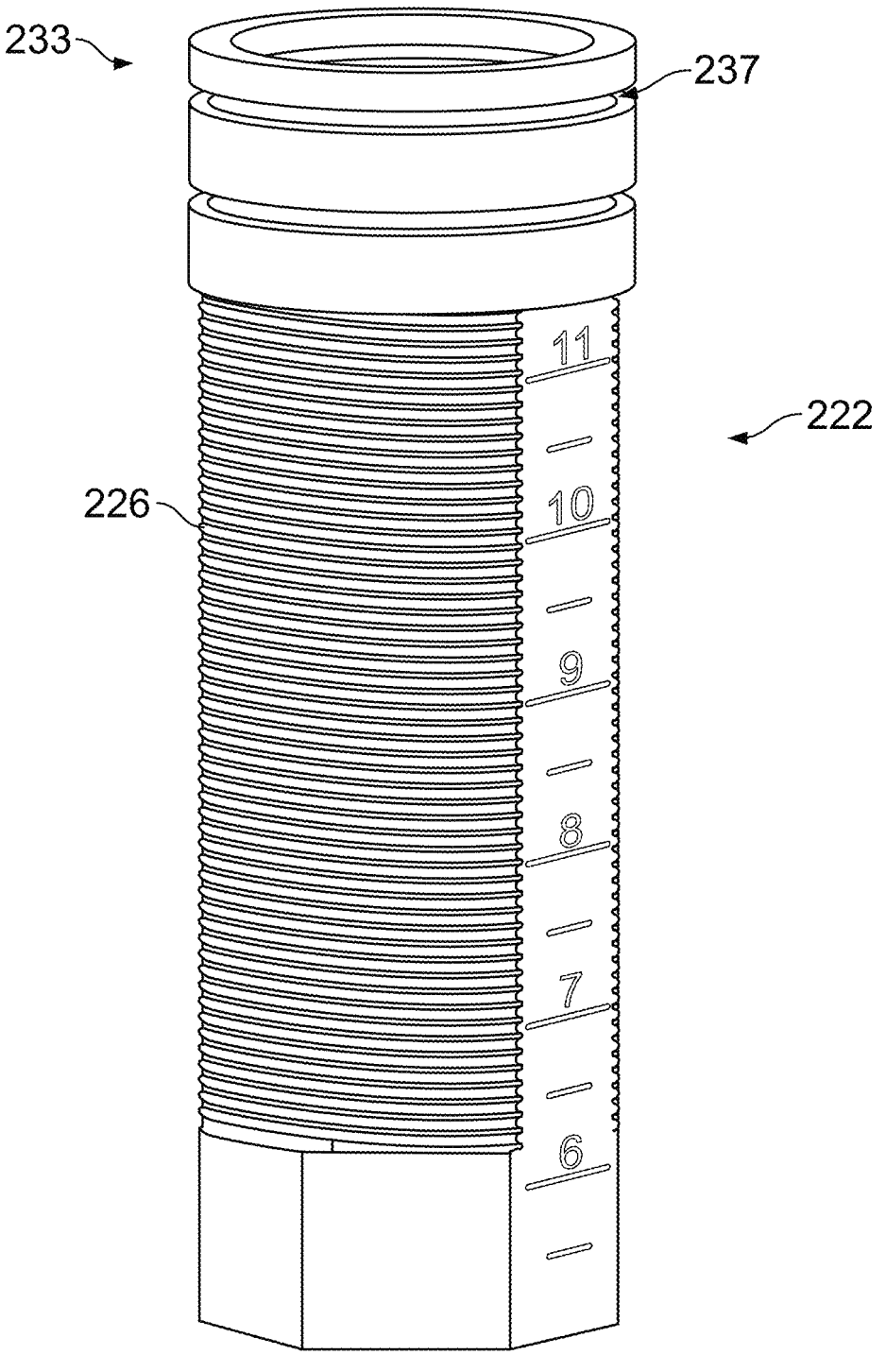
FIG. 13 is a side perspective view of an inner casing of the adjustable drop of FIG. 10 according to exemplary approaches of the disclosure.
Figure 14:
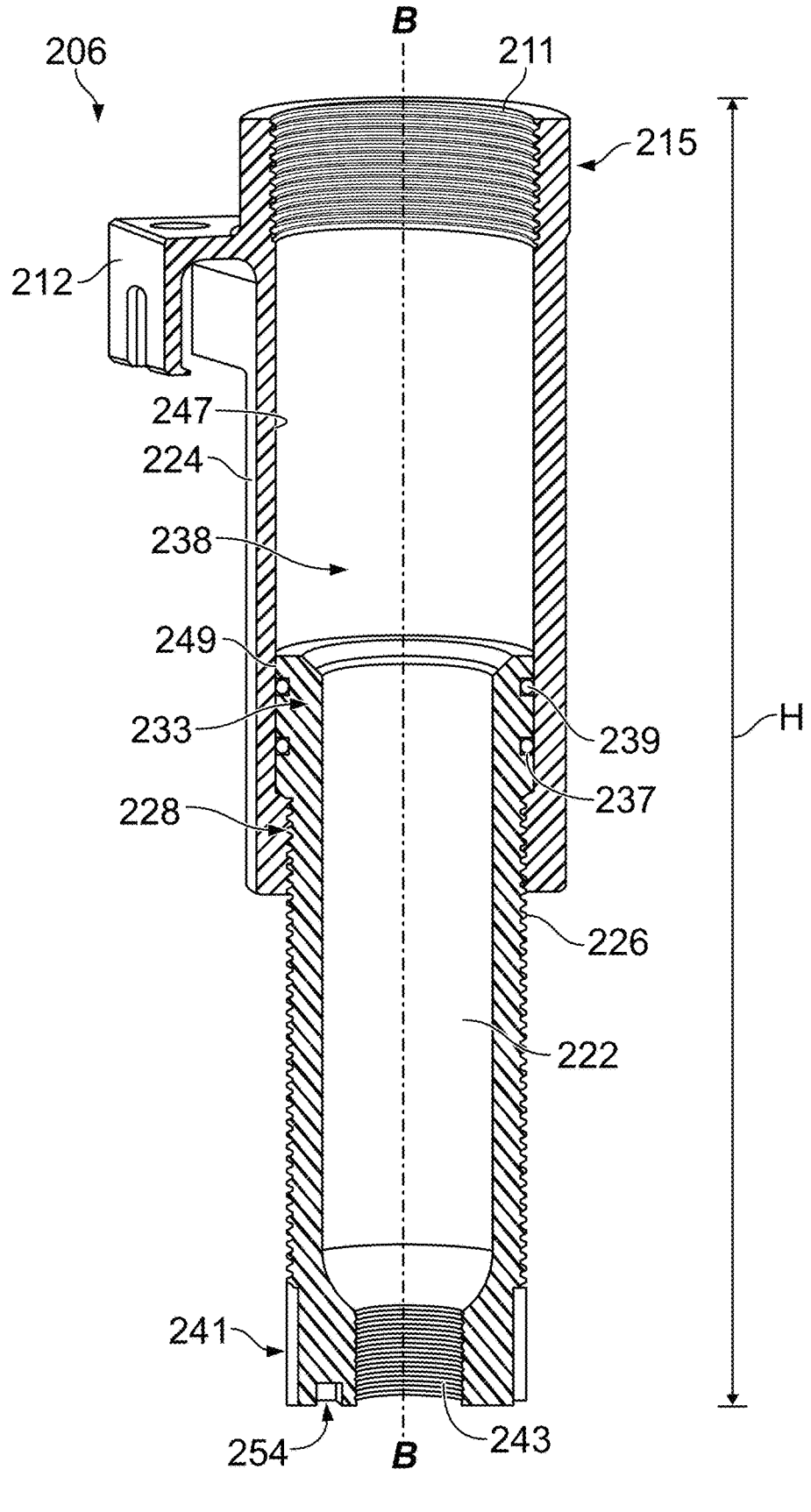
FIG. 14 is a cutaway view of the adjustable drop of FIG. 10 according to exemplary approaches of the disclosure.

Turning now to FIGS. 13-14, the adjustable drop 206 according to embodiments of the disclosure will be described in greater detail. As shown, the inner casing 222 is radially and concentrically arranged internal to the outer casing 224. In exemplary embodiments, the inner and outer casings 222, 224 are telescoping conduits, which are permitted to rotate/slide relative to one another to adjust an axial height, along the lengthwise axis B-B, of the inner casing 222. To accomplish this, the inner casing 222 may include external threading 226 matingly engaged with corresponding internal threading 228 of the outer casing 224. At a proximal end 233 of the inner casing 222, a set of notches 237 are provided circumferentially about the inner casing 222 to receive a set of O-rings 239 therein. The set of notches 237 and O-rings 239 provide a liquid/air tight seal between an inner surface 247 of the outer casing 224 and an outer surface 249 of the inner casing 222. A distal end 241 of the inner casing 222 includes threading 243 to engage and retain the sprinkler head 216 (FIG. 9) therein.

During use, for example when raising the sprinkler head 216, an installer may rotate the inner casing 222 upwards towards the bracket bar 214, thus causing the proximal end 233 of the inner casing 222 to move within an interior cavity 238 of the outer casing 224, towards to the proximal end 215 of the outer casing 224. As a result, an overall height 'H' of the adjustable drop 206 is reduced, thus raising the sprinkler head 216. The threaded connection between the inner and outer casings 222, 224 maintains the position of the inner casing 222 relative to the outer casing 224. Conversely, to lower the sprinkler head 216, the installer may rotate the inner casing 222 downwards and away from the bracket bar 214, causing the proximal end 233 of the inner casing 222 to rotate/slide lower within the internal cavity 238 of the outer casing 224, thus increasing the overall height 'H' of the adjustable drop 206. In some embodiments, a keying feature 254, such as a recess or slot, may be formed in the distal end

241 of the inner casing 222 to assist the installer. The keying feature 254 is configured to receive a corresponding mating male tool or device, which enables rotation of the inner casing 222 relative to the outer casing 224.

It will be appreciated that embodiments of the disclosure advantageously reduce installation time for hose positive attachment to a bracket system using the herein described adjustable drop, which permits adjustment of sprinkler head height and orientation. This provides an advantage over previous approaches in which pre-installed sprinkler heads are inserted into metal hoses prior to reaching the customer installation site. This provides a further advantage over previous ad hoc solutions in which hose drop tic marks are provided along an exterior of the sprinkler assembly to visually indicate height of the sprinkler head to the installer.

While the present disclosure has been described with reference to certain approaches, numerous modifications, alterations and changes to the described approaches are possible without departing from the sphere and scope of the present disclosure, as defined in the appended claims. Accordingly, it is intended that the present disclosure not be limited to the described approaches, but that it has the full scope defined by the language of the following claims, and equivalents thereof. While the disclosure has been described with reference to certain approaches, numerous modifications, alterations and changes to the described approaches are possible without departing from the spirit and scope of the disclosure, as defined in the appended claims. Accordingly, it is intended that the present disclosure not be limited to the described approaches, but that it has the full scope defined by the language of the following claims, and equivalents thereof.

What is claimed is:

1. An adjustable drop comprising:
an inner casing, the inner casing comprising:
   a distal end;
   a proximal end opposite the distal end, the proximal end comprising a shouldered segment; and
   a threaded segment between the distal end and the proximal end, the threaded segment starting at the shouldered segment and extending along the inner casing towards the distal end, the shouldered segment defining an outer radius that is greater than an outer radius of the threaded segment; and
an outer casing surrounding the inner casing, the inner casing and the outer casing including corresponding threading to permit rotation of the inner casing with respect to the outer casing to adjust an axial height, along a lengthwise axis of the adjustable drop, of the inner casing,
wherein the proximal end and the distal end of the inner casing have openings aligned with a longitudinal axis through the outer casing.

2. The adjustable drop of claim 1, wherein the outer casing further comprises a proximal end, a distal end, and an inner surface, and wherein the inner surface comprises a distal shoulder configured to contact the shouldered segment of the inner casing and to prevent the inner casing from being released out the distal end of the outer casing.

3. The adjustable drop of claim 2, wherein the threading of the inner casing is provided on an outer surface of the inner casing, and wherein the threading of the outer casing is provided on the inner surface of the outer casing.

4. The adjustable drop of claim 2, wherein the inner casing further comprises a gasket, the gasket including a set of O-rings in contact with the inner surface of the outer casing.

5. The adjustable drop of claim 1, further comprising a keying feature formed in a distal end of the adjustable drop, the keying feature configured to receive a device for rotating the inner casing.

6. The adjustable drop of claim 1, wherein the proximal end of the outer casing has internal threading to receive a sprinkler conduit.

7. The adjustable drop of claim 6, wherein the sprinkler conduit is a flexible metal conduit directly coupled to the proximal end of the inner casing via the internal threading.

8. The adjustable drop of claim 1, wherein the distal end and the proximal end of the outer casing are aligned with the longitudinal axis.

9. An integral hub and drop assembly comprising:

a bracket hub; and an adjustable drop integrally formed as one piece with the bracket hub, the adjustable drop defining a lengthwise axis, the adjustable drop having openings at distal and proximal ends that align with the lengthwise axis;

wherein the bracket hub defines an inverted U-shaped opening offset outboardingly to a first side of the lengthwise axis, the inverted U-shaped opening configured to receive a bracket bar, and wherein the bracket hub further defines a U-shaped side opening transverse to the inverted U-shaped opening, the adjustable drop extending through the U-shaped side opening.

10. The integral hub and drop assembly of claim 9, wherein the U-shaped side opening is integrally coupled to the first side of the adjustable drop.

11. The integral hub and drop assembly of claim 10, wherein the U-shaped side opening is welded to the first side of the adjustable drop.

12. The integral hub and drop assembly of claim 9, wherein the adjustable drop comprises an inner casing and an outer casing surrounding the inner casing.

13. The integral hub and drop assembly of claim 12, wherein each of the inner casing and the outer casing include corresponding threading configured to permit rotation between the inner casing and the outer casing to adjust an axial height of the inner casing along the lengthwise axis.

*   *   *   *   *